US009713874B2

(12) United States Patent
Lee et al.

(10) Patent No.: US 9,713,874 B2
(45) Date of Patent: Jul. 25, 2017

(54) ACTUATOR AND MANIPULATOR INCLUDING THE SAME

(71) Applicant: Samsung Electronics Co., Ltd., Suwon-Si, Gyeonggi-Do (KR)

(72) Inventors: Youn Baek Lee, Suwon-si (KR); Yong Jae Kim, Seoul (KR); Jeong Hun Kim, Hwaseong-si (KR); Kyung Shik Roh, Seongnam-si (KR); Se Gon Roh, Suwon-si (KR); Jong Won Lee, Uiwang-si (KR); Byung June Choi, Gunpo-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 54 days.

(21) Appl. No.: 14/532,399

(22) Filed: Nov. 4, 2014

(65) Prior Publication Data
US 2015/0122071 A1 May 7, 2015

(30) Foreign Application Priority Data

Nov. 5, 2013 (KR) ........................ 10-2013-0133732

(51) Int. Cl.
*B25J 9/06* (2006.01)
*B25J 18/06* (2006.01)
(Continued)

(52) U.S. Cl.
CPC ................ *B25J 18/06* (2013.01); *B25J 9/06* (2013.01); *B25J 9/104* (2013.01); *B25J 17/00* (2013.01);
(Continued)

(58) Field of Classification Search
CPC ...... B25J 9/06; B25J 9/065; B25J 9/104; B25J 9/106; B25J 9/1045; B25J 18/06; B25J 17/00
See application file for complete search history.

(56) References Cited

U.S. PATENT DOCUMENTS 4,494,417 A * 1/1985 Larson .................. B05B 15/061
414/7
5,317,952 A * 6/1994 Immega .................... B25J 9/104
74/490.04
(Continued)

FOREIGN PATENT DOCUMENTS

| JP | 2004130440 A | 4/2004 |
| JP | 2009106606 A | 5/2009 |

(Continued)

OTHER PUBLICATIONS

Extended European Search Report dated Mar. 13, 2015 for EP Application No. 14190117.3.

*Primary Examiner* — William Kelleher
*Assistant Examiner* — Gregory T Prather
(74) *Attorney, Agent, or Firm* — Harness, Dickey & Pierce, P.L.C.

(57) ABSTRACT

Disclosed is a manipulator including a wire driving actuator to bend base and terminal sections of a joint assembly in multiple directions by a base section wire and a terminal section wire. The terminal section driving wire is operatively connected to the base section driving wire such that the terminal section driving wire is moved by a distance equal to a movement distance of the base section driving wire. Accordingly, it is possible to prevent bending of the terminal section upon bending the base section.

20 Claims, 11 Drawing Sheets

(51) Int. Cl.
*B25J 9/10* (2006.01)
*B25J 17/00* (2006.01)

(52) U.S. Cl.
CPC .... *Y10T 74/20323* (2015.01); *Y10T 74/20329* (2015.01)

(56) References Cited

U.S. PATENT DOCUMENTS

| | | | |
|---|---|---|---|
| 8,661,927 B2* | 3/2014 | Anderson | B25J 9/104 600/1 |
| 2008/0161971 A1* | 7/2008 | Buckingham | B25J 9/06 700/258 |
| 2008/0177282 A1 | 7/2008 | Lee et al. | |
| 2011/0277579 A1 | 11/2011 | Anderson et al. | |
| 2013/0090763 A1* | 4/2013 | Simaan | A61B 5/11 700/258 |

FOREIGN PATENT DOCUMENTS

| | | | |
|---|---|---|---|
| KR | 20100048789 A | 5/2010 | |
| WO | WO-2007146987 A2 | 12/2007 | |

* cited by examiner

ACTUATOR AND MANIPULATOR INCLUDING THE SAME

CROSS-REFERENCE TO RELATED APPLICATIONS

This application claims the benefit of Korean Patent Application No. P2013-133732, filed on Nov. 5, 2013 in the Korean Intellectual Property Office, the disclosure of which is incorporated herein by reference.

BACKGROUND

1. Field

Example embodiments relate to an actuator and/or a manipulator including the same. In one or more example embodiments, the manipulator includes a wire driving actuator configured to bend a joint assembly in various directions.

2. Description of the Related Art

A joint assembly of a manipulator may include a plurality of joints that are controlled by a wire driving actuator that operates the joint assembly via wires connected therebetween to bend the joints in the joint assembly.

In such a manipulator, the joint assembly thereof includes a base section disposed adjacent to the wire driving actuator, and a terminal section. A base section driving wire is connected to a front end of the base section, and a terminal section driving wire is connected to a front end of the terminal section and, as such, the base section and terminal section are operated by the base section driving wire and terminal section driving wire.

The wires associated with the terminal section may pass through joints associated with the base section that is relatively closer to the wire driving actuator. Conventionally, when the joints closer to the actuator bend, the wires associated with the joints further away from the wire driving actuator that pass therethrough may inadvertently be influenced causing these joints to unintentionally bend.

SUMMARY

In some example embodiments, a manipulator is capable of reducing bending of a terminal section during bending of a base section.

Additional aspects of the example embodiments will be set forth in part in the description which follows and, in part, will be obvious from the description, or may be learned by practice.

In some example embodiments, a manipulator includes a joint assembly constituted by a plurality of joints each connected to one another, and a wire driving actuator to bend the joint assembly in plural directions by a plurality of wires, wherein the joint assembly comprises a base section disposed adjacent to the wire driving actuator, and a terminal section spaced apart from the wire driving actuator, wherein the plurality of wires comprise a plurality of base section driving wires to bend the base section, and a plurality of terminal section driving wires to bend the terminal section, wherein the terminal section driving wires are operatively connected to the base section driving wires such that the terminal section driving wires are moved by a distance equal to a movement distance of the base section driving wires.

The wire driving actuator may include a base frame, at least one base section driving lever rotatably mounted to the base frame, the base section driving lever supporting the base section driving wires, to drive the base section driving wires, and at least one terminal section driving lever rotatably mounted to the base frame while being coaxial with the base section driving lever, the terminal section driving lever supporting the terminal section driving wires, to drive the terminal section driving wires. The terminal section driving wires may be installed at the terminal section driving lever after passing through the base section driving lever. The terminal section driving wires may be arranged on the base section driving lever, to be substantially parallel with the base section driving wires.

The base section driving lever may include base section driving pulleys, on which the base section driving wires are wound, respectively, and linkage pulleys, on which the terminal section driving wires are wound, respectively, each of the linkage pulley being coaxial with the base section driving pulleys, respectively. The terminal section driving lever may include terminal section driving pulleys, on which the terminal section driving wires extending from the linkage pulleys are wound, respectively.

The manipulator may further include guide shafts spaced apart from the driving levers, and guide pulleys mounted on the guide shafts. The guide pulleys may include first guide pulleys to guide the base section driving wires to the base section driving pulleys, respectively, second guide pulleys to guide the base section driving wires extending from the base section driving pulleys, respectively, third guide pulleys to guide the terminal section driving wires to the linkage pulleys, respectively, fourth guide pulleys to guide the terminal section driving wires extending from the linkage pulleys to the terminal section driving pulleys, respectively, and fifth guide pulleys to guide the terminal section driving wires extending from the terminal section driving pulleys, respectively.

Associated ones of the first guide pulleys, the base section driving pulleys and the second guide pulleys may have a positional relation identical to a position relation among associated ones of the second guide pulleys, the linkage pulleys, and the third guide pulleys.

Associated ones of the first guide pulleys, the base section driving pulleys and the second guide pulleys may have a positional relation identical to a position relation among associated ones of the third guide pulleys, the terminal section driving pulleys, and the fifth guide pulleys.

The base section driving pulleys may include a pair of base section driving pulleys symmetrically arranged at opposite sides of the base section driving lever, and the linkage pulleys comprises a pair of linkage pulleys symmetrically arranged at opposite sides of the base section driving lever. The terminal section driving pulleys may include a pair of terminal section driving pulleys symmetrically arranged at opposite sides of the terminal section driving lever. The guide shafts may include a pair of guide shafts symmetrically mounted to the base frame, and the first to fifth guide pulleys mounted on the guide shafts comprise a pair of first guide pulleys, a pair of second guide pulleys, a pair of third guide pulleys, a pair of fourth guide pulleys, and a pair of fifth guide pulleys, to be symmetrically arranged at the base frame. The base section driving wires may include a pair of base section driving wires symmetrically arranged at opposite sides of the base section driving lever, and the terminal section driving wires comprise a pair of terminal section driving wires symmetrically arranged at opposite sides of the terminal section driving lever.

The at least one base section driving lever, which supports the base section driving wires at opposite sides thereof, may include a pair of base section driving levers symmetrically installed at opposite sides of the base frame. The at least one terminal section driving lever, which supports the terminal section driving wires at opposite sides thereof, may include a pair of terminal section driving levers symmetrically installed at opposite sides of the base frame. The pair of guide shafts and the first to fifth guide pulleys mounted on the pair of guide shafts may be arranged at opposite sides of the base frame such that two pairs of guide shafts are installed at the base frame. The first to fifth guide pulleys may be mounted on each guide shaft of the two pairs of guide shafts.

The wire driving actuator may further include a plurality of driving motors to generate rotational force, a plurality of pinions to be rotated by the driving motors, respectively, and a plurality of gears respectively mounted to the base section driving lever and the terminal section driving lever while being engaged with the pinions.

The wire driving actuator may further include position identification members respectively provided at the base section driving lever and the terminal section driving lever, and sensors to sense the position identification members, respectively.

The terminal section driving wires are operatively connected to the base section driving wires such that the terminal section driving wires are moved by a distance equal to a movement distance of the base section driving wires. Accordingly, it is possible to prevent unintentional bending of the terminal section upon bending the base section.

One or more example embodiments relate to an actuator configured to actuate a joint assembly having interconnected joints arranged along a base and terminal section thereof.

In some example embodiments, the actuator includes a terminal driving lever including a plurality of terminal pulleys and associated terminal cables, the terminal driving lever configured to bend the joints in the terminal section of the joint assembly; and a base driving lever including a plurality of base pulleys and associated base cables, the base driving lever configured to bend the joints in the base section of the joint assembly such that, when the base driving lever bends the joints in the base section, the base driving lever exerts an adjustment force on the terminal cables such that the terminal cables are pulled a same distance as associated base cables.

In some example embodiments, the base driving lever and the terminal driving lever are configured to rotate around a central shaft.

In some example embodiments, the plurality of base pulleys associated with the base driving lever are configured to rotate around the central shaft along with the base driving lever and include a drive pulley and a link pulley, the drive pulley configured to pull the base cable and the link pulley configured to pull the terminal cables.

In some example embodiments, the drive pulley and the link pulley are on the base driving lever such that the drive pulley and the link pulley are symmetrical with respect to the central shaft.

In some example embodiments, the actuator further includes first guide pulleys on a first guide shaft and second guide pulleys on a second guide shaft, each of the first guide pulleys and second guide pulleys including pulleys configured to pull the terminal cable and the driving cable.

In some example embodiments, associated ones of the first guide pulleys and the drive pulley have a same positional relation as a position relation of associated ones of the second guide pulley and the linkage pulley.

In some example embodiments, the first guide pulleys and the second guide pulleys are symmetrically on the first guide shaft and the second guide shaft, respectively, the first guide pulleys include first to fifth first guide pulleys on the first guide shaft, and the second guide pulleys include first through fifth second guide pulleys on the second guide shaft.

In some example embodiments, the actuator further includes pinions configured to selectively engage gears of one or more of the base driving lever and the terminal driving lever; and a plurality of driving motors configured to exert rotational forces on the pinions such that the one or more of the base driving lever and the terminal driving lever rotate about the central shaft.

In some example embodiments, the base driving lever and the terminal driving lever have positional markers associated therewith, the positional markers indicating a rotational position of an associated one of the base driving lever and the terminal driving lever about the central axis.

In some example embodiments, the actuator further includes sensors configured to sense the rotational position of the base driving lever and the terminal driving lever about the central axis.

BRIEF DESCRIPTION OF THE DRAWINGS

These and/or other aspects of the example embodiments will become apparent and more readily appreciated from the following description of the embodiments, taken in conjunction with the accompanying drawings of which.

DETAILED DESCRIPTION

Figure 1:
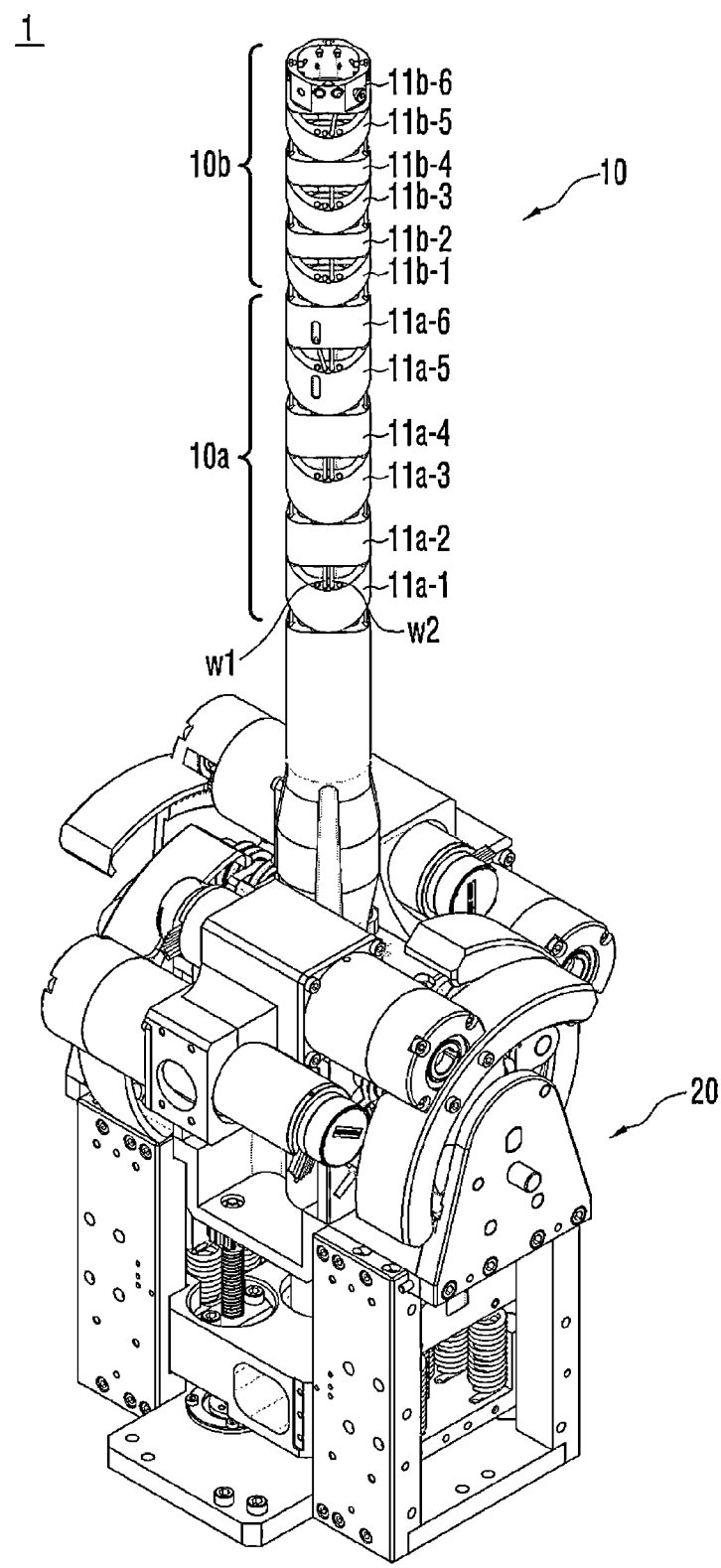
FIG. 1 is a perspective view of a manipulator according to some example embodiments.

Reference will now be made in detail to example embodiments, some examples of which are illustrated in the accompanying drawings.

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Figure 2:
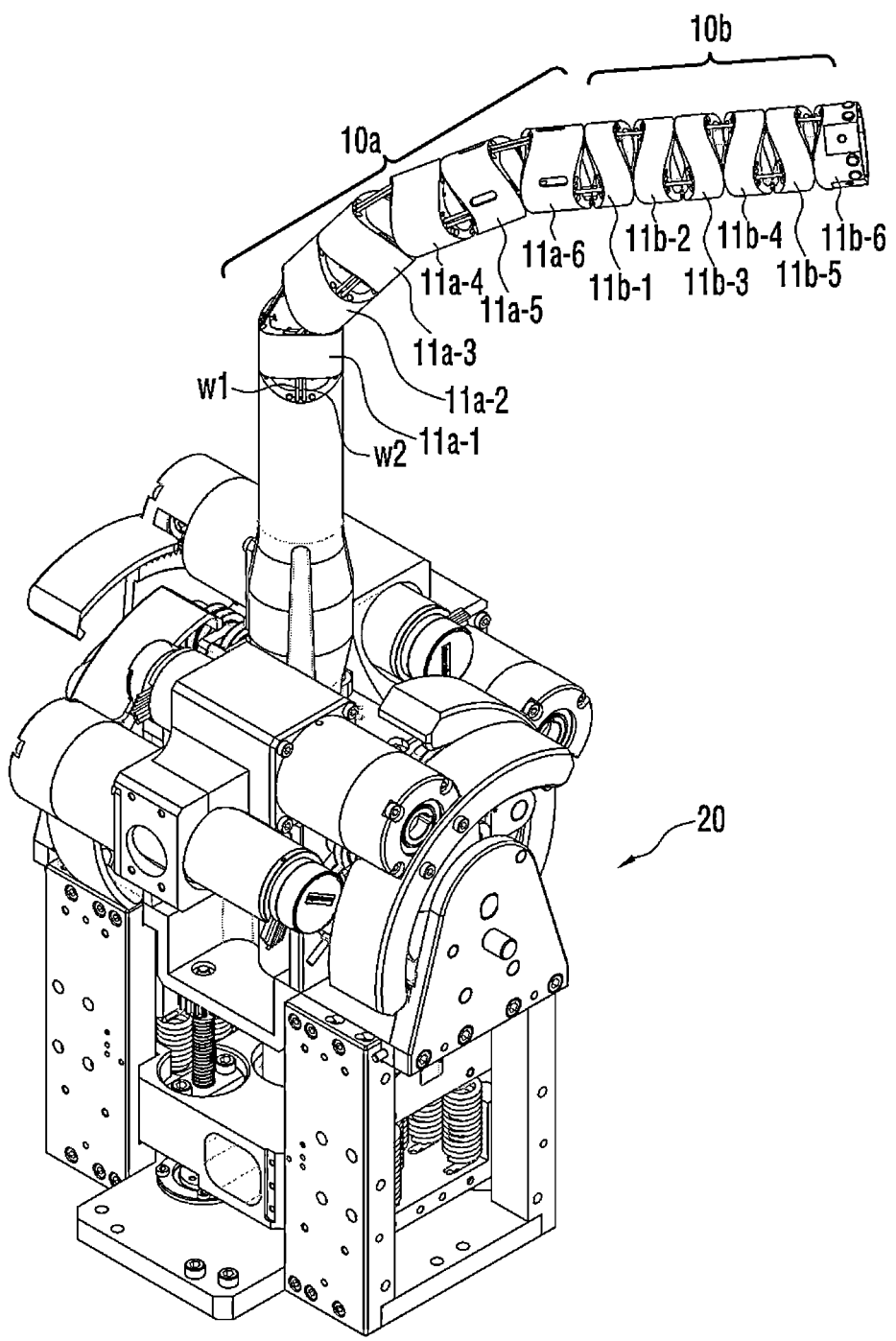
FIG. 2 is a perspective view illustrating operation of a base section in the manipulator according to some example embodiments.
Figure 3:
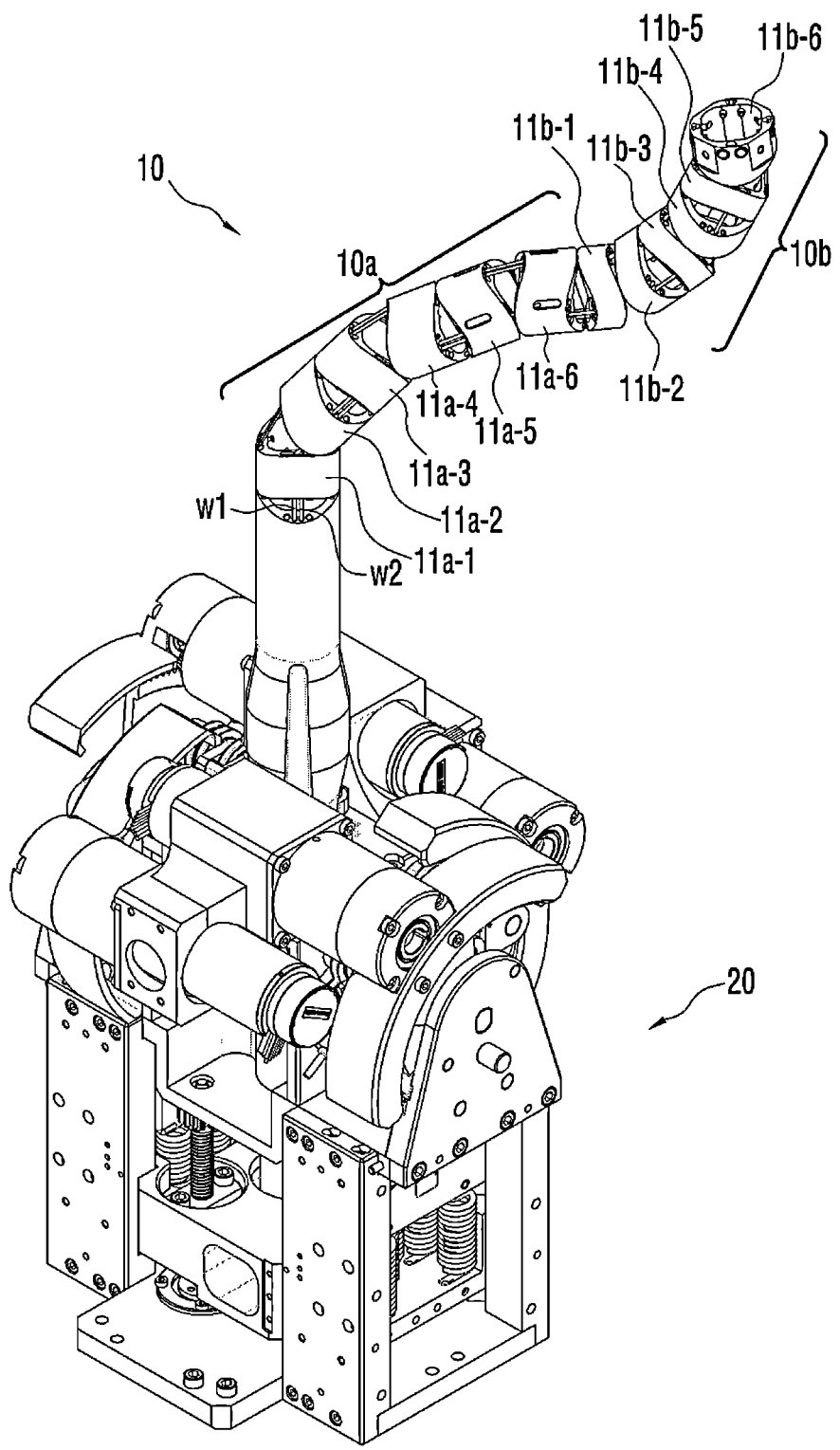
FIGS. 3 and 4 are perspective views illustrating operation of base and terminal sections in the manipulator according to some example embodiments.
Figure 4:
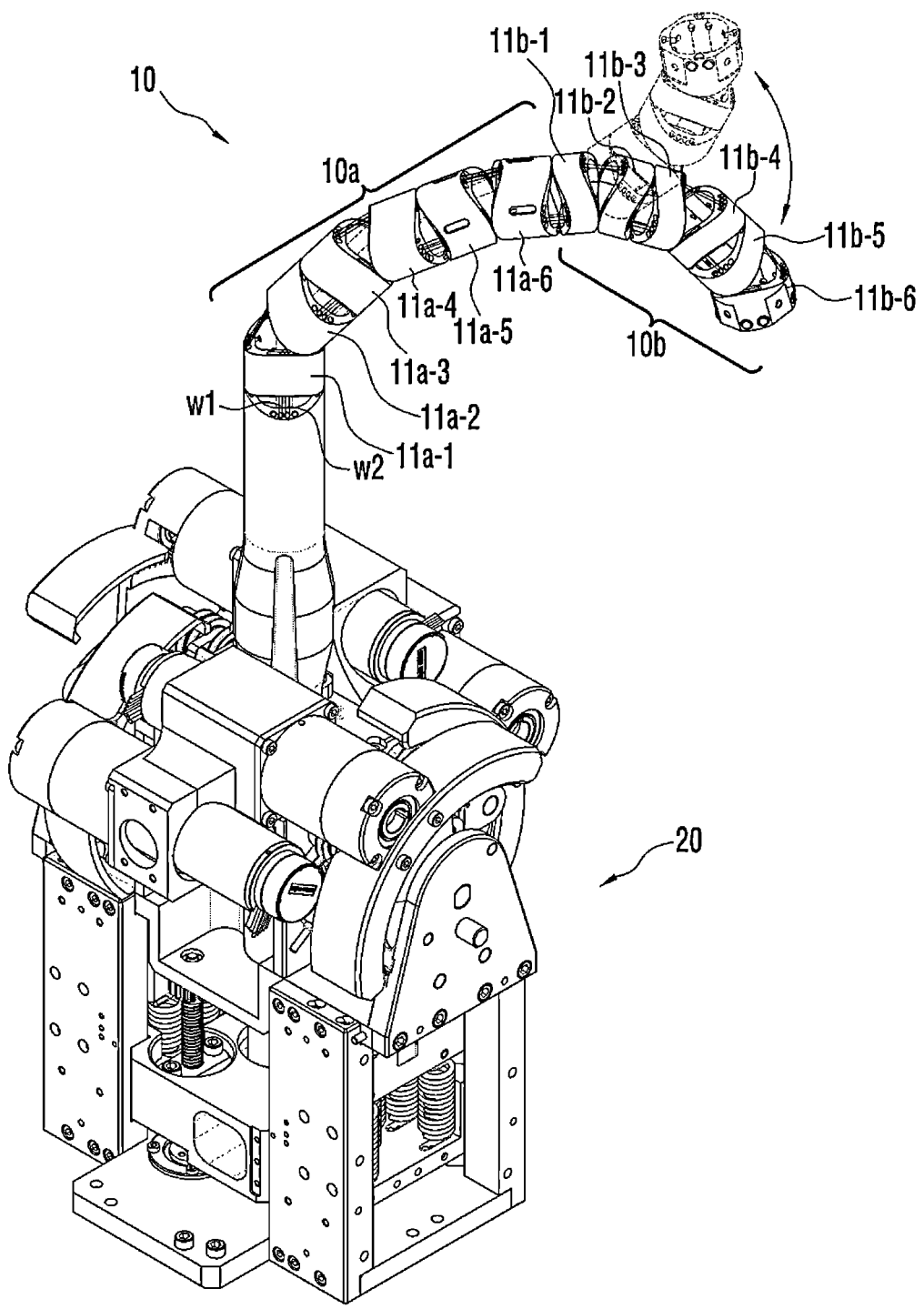

FIG. 1 is a perspective view of a manipulator according to some example embodiments. FIG. 2 is a perspective view illustrating operation of a base section in the manipulator according to some example embodiments. FIGS. 3 and 4 are perspective views illustrating operation of base and terminal sections in the manipulator according to some example embodiments.

Referring to FIGS. 1 to 4, a manipulator 1 may include a joint assembly 10 constituted by a plurality of joints 11a-1 to 11a-6 and 11b-1 to 11b-6, and a wire driving actuator 20 to drive wires W1 and W2 connected to the joint assembly 10, for bending of the joint assembly 10.

Each of the joints 11a-1 to 11a-6 and 11b-1 to 11b-6 constituting the joint assembly 10 may be an annular shape. Concave and convex portions are formed at opposite ends of each joint. The joints 11a-1 to 11a-6 and 11b-1 to 11b-6 are axially arranged in such a manner that the concave and convex portions thereof are alternately arranged, and, as such, the joint assembly 10 has a tubular structure. Neighboring ones of the joints 11a-1 to 11a-6 and 11b-1 to 11b-6 co-operate in accordance with co-operation of concave and convex portions provided at opposite ends thereof, to bend the joint assembly 10.

The joint assembly 10 includes a base section 10a disposed adjacent to the wire driving actuator 20, and a terminal section 10b extending from the base section 10a. One end of the wire W1 is connected to the joint 11a-6, which forms a front end of the base section 10a. Similarly, one end of the wire W2 is connected to the joint 11b-6, which forms a front end of the terminal section 10b. Accordingly, the base section 10a and terminal section 10b may be independently bent, as illustrated in FIGS. 2 to 4.

The end of the wire W1 that is mounted to the joint 11a-6 passes through through-holes provided at the joints 11a-1 to 11a-6. Similarly, the wire W2 that is mounted to the joint 11b-6 passes through through-holes provided at the joints 11b-1 to 11b-6. The other end of each of the wires W1 and W2 is mounted to the wire driving actuator 20. Thus, the wires W1 and W2 transmit power from the wire driving actuator 20 to the joint assembly 10.

The wire W1, which is a base section driving wire, is connected to the front end of the base section 10a, to bend the base section 10a. Similarly, the wire W2, which is a terminal end driving wire, is connected to the front end of the terminal section 10b, to bend the terminal section 10b. As discussed in more detail below, in some example embodiments, the terminal section driving wire W2 may be operatively connected to the base section driving wire W1 such that the terminal section driving wire W2 is moved by the same movement distance as the base section driving wire W1 when the base section driving wire W1 moves.

The joint assembly may include four base section driving wires W1 and four terminal section driving wires W2 to bend the base section 10a and terminal section 10b in four directions.

Figure 5:
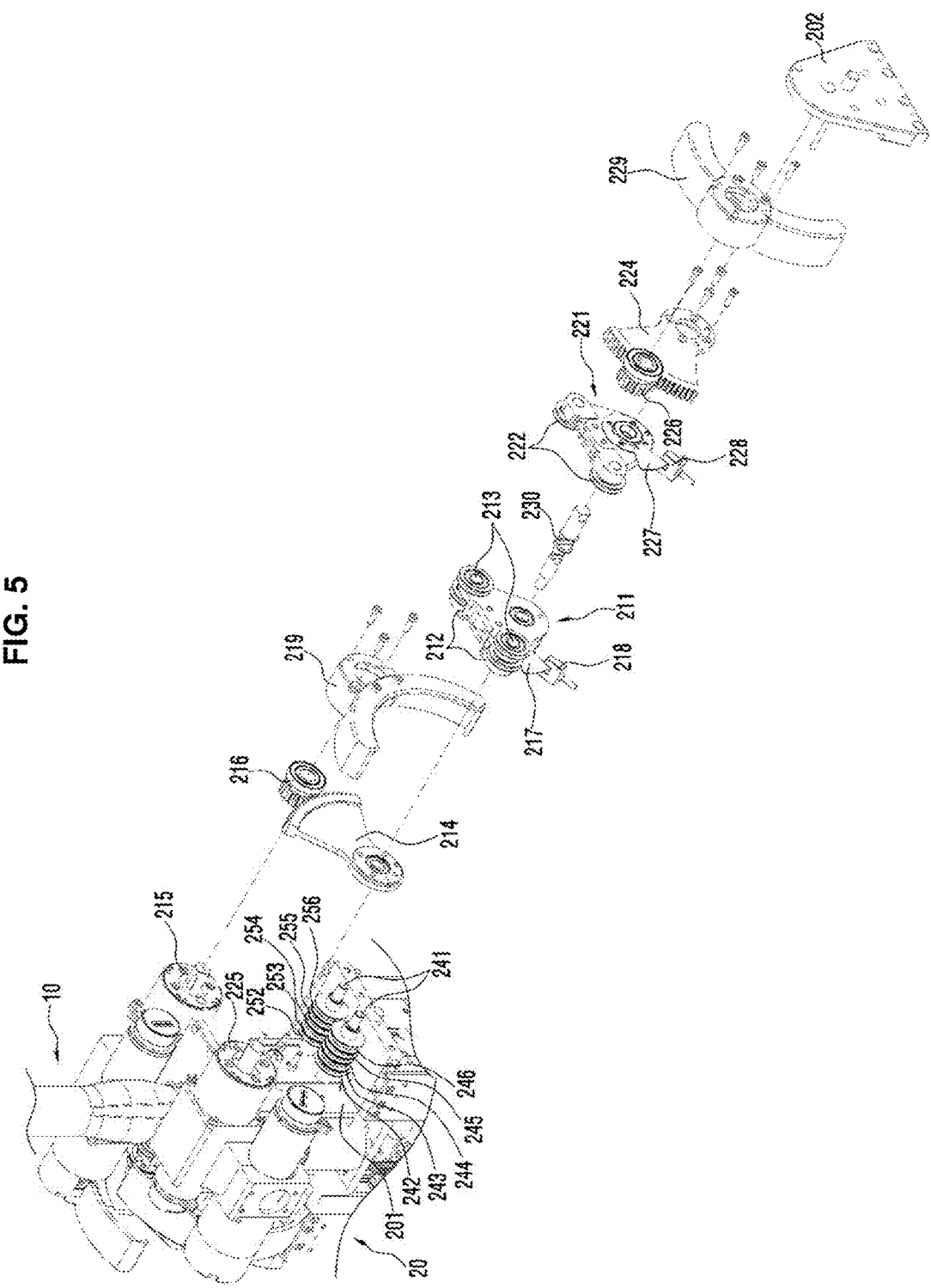
FIG. 5 is an exploded perspective view of a wire driving actuator in the manipulator according to some example embodiments.

FIG. 5 is an exploded perspective view of a wire driving actuator in the manipulator according to some example embodiments.

Referring to FIG. 5, the wire driving actuator 20 may include a base frame 201 to support constituent elements of the wire driving actuator 20, a plurality of driving levers 211 and 221 rotatably mounted to the base frame 201, to move the wires W1 and W2 in accordance with rotational movements thereof, respectively, and a hinge frame 202 to support a central shaft 230, which will be described later.

The driving lever 211 is a base section driving lever to drive the base section 10a, whereas the driving lever 221 is a terminal section driving lever to drive the terminal section 10b. The base section driving lever 211 and terminal section driving lever 221 are coaxially installed. The base section driving lever 211 and terminal section driving lever 221 may be rotatably mounted to the base frame 201 by a single shaft, namely, the central shaft 230.

A base section driving pulley 212 and a linkage pulley 213 are mounted to the base section driving lever 211. The base section driving wire W1 may be wound around the base section driving pulley 212. The linkage pulley 213 is coaxially arranged with respect to the base section driving pulley 212. The terminal section driving wire W2 may be wound around the linkage pulley 213.

A terminal section driving pulley 222 may be mounted to the terminal section driving lever 221. In addition to being wound around the linkage pulley 213, the terminal section driving wire W2 may also be wound around the terminal section driving pulley 222 after extending from the linkage pulley 213.

A plurality of guide pulleys 242 to 246 are mounted to a guide shaft 241 spaced apart from the driving levers 211 and 221, in order to guide the base section driving wire W1 and terminal section driving wire W2 to the driving pulleys 212 and 222 and linkage pulley 213. The guide pulleys include a first guide pulley 242 to guide the base section driving wire W1 to the base section driving pulley 212, a second guide pulley 243 to guide the base section driving wire W1 extending from the base section driving pulley 212, a third guide pulley 244 to guide the terminal section driving wire W2 to the linkage pulley 213, a fourth guide pulley 245 to guide the terminal section driving wire W2 extending from the linkage pulley 213 to the terminal section driving pulley 222, and a fifth guide pulley 246 to guide the terminal section driving wire W2 extending from the terminal section driving pulley 222.

When four base section driving wires W1 and four terminal section driving wires W2 are provided, as described above, a pair of base section driving levers 211, a pair of terminal section driving levers 221, and two pairs of guide shafts 241 are symmetrically arranged at opposite sides of the base frame 201, to move the four base section driving wires W1 and four terminal section driving wires W2. In this case, a pair of base section driving pulleys 212 and a pair of linkage pulleys 213 are mounted to each base section driving lever 211, and a pair of terminal section driving pulleys 222 is mounted to each terminal section driving lever 221. In addition, the first to fifth guide pulleys 252 to 256 are mounted to a second one of guide shafts 241.

Figure 6:
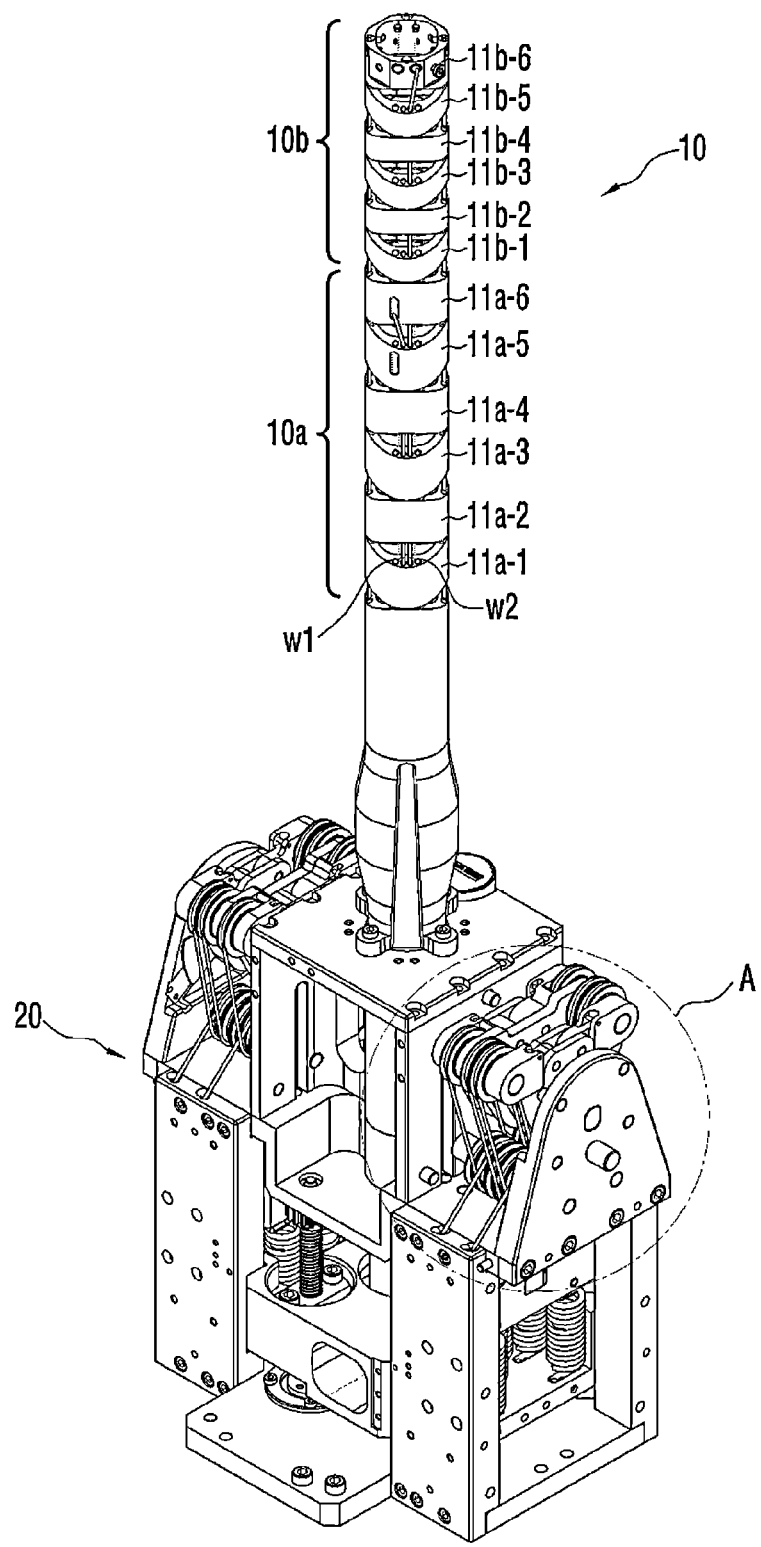
FIG. 6 is a perspective view of driving levers in the manipulator according to some example embodiments.
Figure 7:
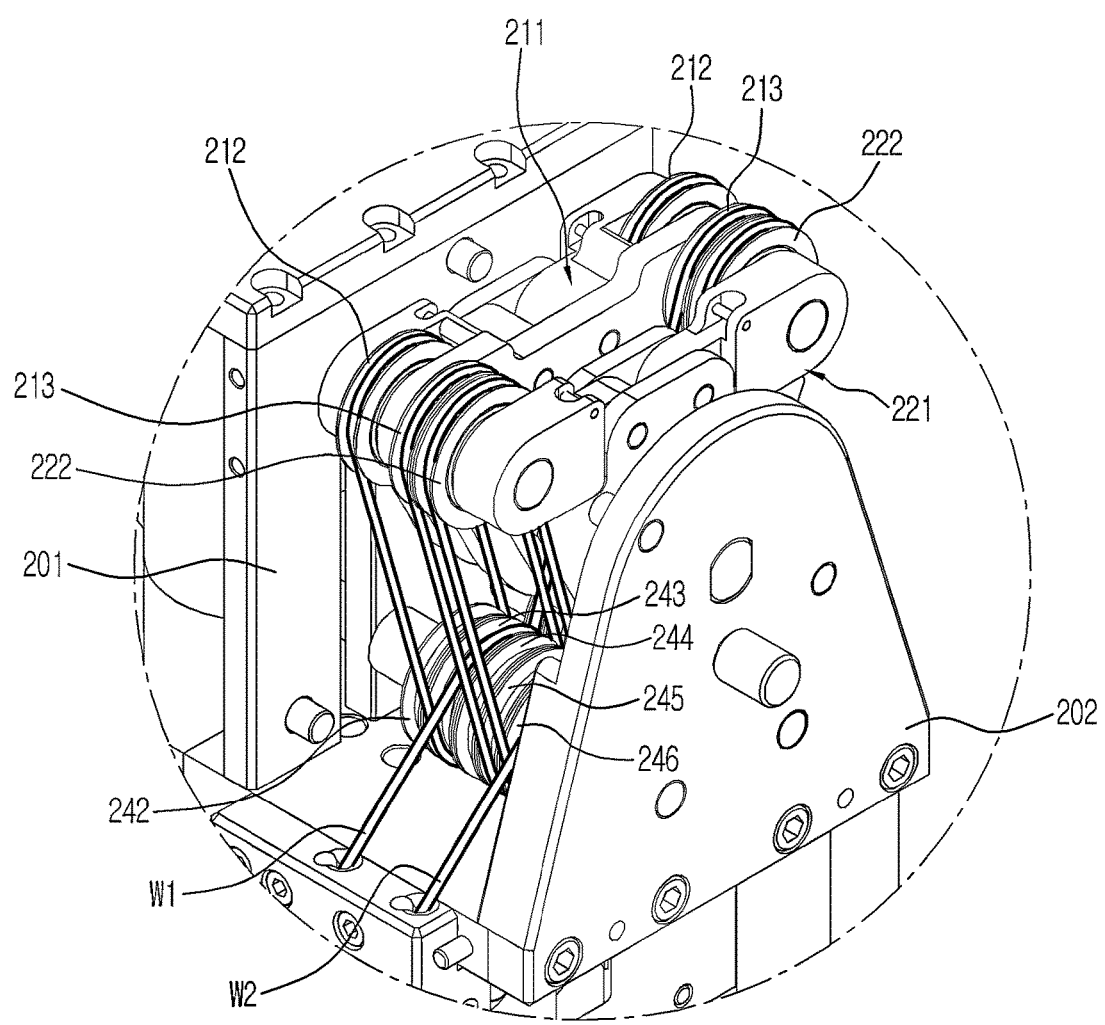
FIG. 7 is an enlarged view of a portion A in FIG. 6.

FIG. 6 is a perspective view of driving levers in the manipulator according to some example embodiments. FIG. 7 is an enlarged view of a portion A in FIG. 6.

Referring to FIGS. 5 to 7, each base section driving wire W1 is fixed to the base frame 201 after being sequentially wound around the associated first guide pulley 242, base section driving pulley 212, and second guide pulley 243. Each terminal section driving wire W2 is fixed to the base frame 201 after being sequentially wound around the associated third guide pulley 244, linkage pulley 213, fourth guide pulley 245, terminal section driving pulley 222, and fifth guide pulley 246.

The base driving pulleys 212 and linkage pulleys 213 mounted in pair to each base section driving lever 211 are symmetrically arranged at opposite sides of the base section driving lever 211. The terminal section driving pulleys 222 mounted in pair to each terminal section driving lever 221 are symmetrically arranged at opposite sides of the terminal section driving lever 221. The guide shafts 241 are symmetrically arranged in pair at opposite sides of the base frame 201. The first to fifth guide pulleys 242 to 246 are mounted to each guide shaft 241, to be symmetrically arranged in pair at opposite sides of the base frame 201. Thus, a pair of base section driving wires W1 is symmetrically arranged at opposite sides of each base section driving lever 211, and a pair of terminal section driving wires W2 is symmetrically arranged at opposite sides of the terminal section driving lever 221.

In order to rotate two base section driving levers 211 and two terminal section driving levers 221, the wire driving actuator 20 includes four driving motors 215 and 225 to generate rotational force, four pinions 216 and 226 to be rotated by the driving motors 215 and 225, respectively, and four gears 214 and 224 respectively mounted to the two base section driving levers 211 and the two terminal section driving levers 221 while being engaged with the pinions 216 and 226. Four gear covers 219 and 229 are also mounted to the wire driving actuator 20, to cover respective pinions 216 and 226 and respective gears 214 and 224.

In order to identify positions of the driving levers 211 and 221, the wire driving actuator 20 further includes position identification members 217 and 227 protruding from associated ones of the driving levers 211 and 221, and sensors 218 and 228 to sense respective position identification members 217 and 227. Each of the sensors 218 and 228 may be an optical sensor.

The position identification member 217 is a base section driving lever position identification member provided at each base section driving lever 211 in order to identify a position of the base section driving lever 211. The position identification member 227 is a terminal section driving lever position identification member provided at each terminal section driving lever 221 in order to identify a position of the terminal section driving lever 221. The sensor 218 is a base section driving lever sensor to sense an associated one of the position identification members 217, whereas the sensor 228 is a terminal section driving lever sensor to sense an associated one of the position identification members 227.

Pulley arrangement is designed such that the positional relation among the associated first guide pulley 242, base section driving pulley 212 and second guide pulley 243 is identical to the position relation among the associated second guide pulley 243, linkage pulley 213, and third guide pulley 244 and the position relation among the associated third guide pulley 244, terminal section driving pulley 222, and fifth guide pulley 246.

Accordingly, two base section driving wires W1 symmetrically arranged at opposite sides of each base section driving lever 211 are moved in opposite directions in accordance with rotation of the base section driving lever 211. Similarly, two terminal section driving wires W2 symmetrically arranged at opposite sides of each terminal section driving lever 221 are moved in opposite directions in accordance with rotation of the terminal section driving lever 221.

The drive actuator 20 may include a processor and a memory (not shown).

The processor may be a controller and an arithmetic logic unit, a digital signal processor, a microcomputer, a field programmable array, a programmable logic unit, a microprocessor or any other device capable of responding to and executing instructions in a defined manner such that the processor is programmed with instructions that configure the processing device as a special purpose computer to engage the pinions 216 and 226 with the gears 214 and 224, respectively, and to drive the motors 215 and 225 based on signals from the sensors 218 and 228.

The instructions may be stored on a non-transitory computer readable medium. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors.

Figure 8:
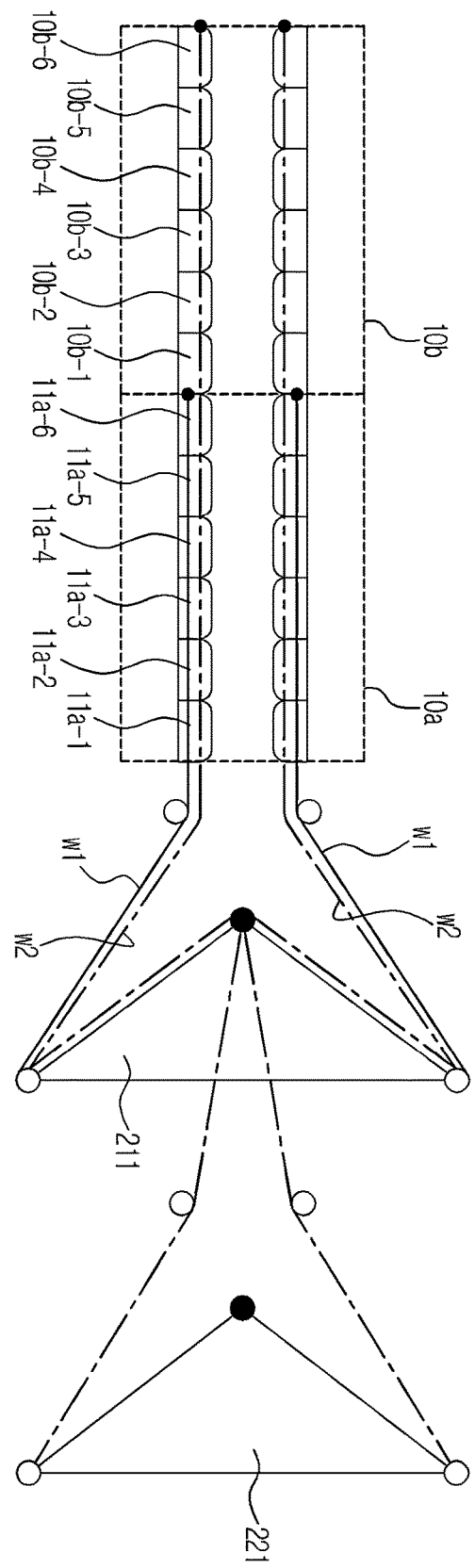
FIGS. 8 and 9 are concept views schematically illustrating operation of the manipulator according to some example embodiments and operation of the wire driving actuator in the manipulator.
Figure 9:
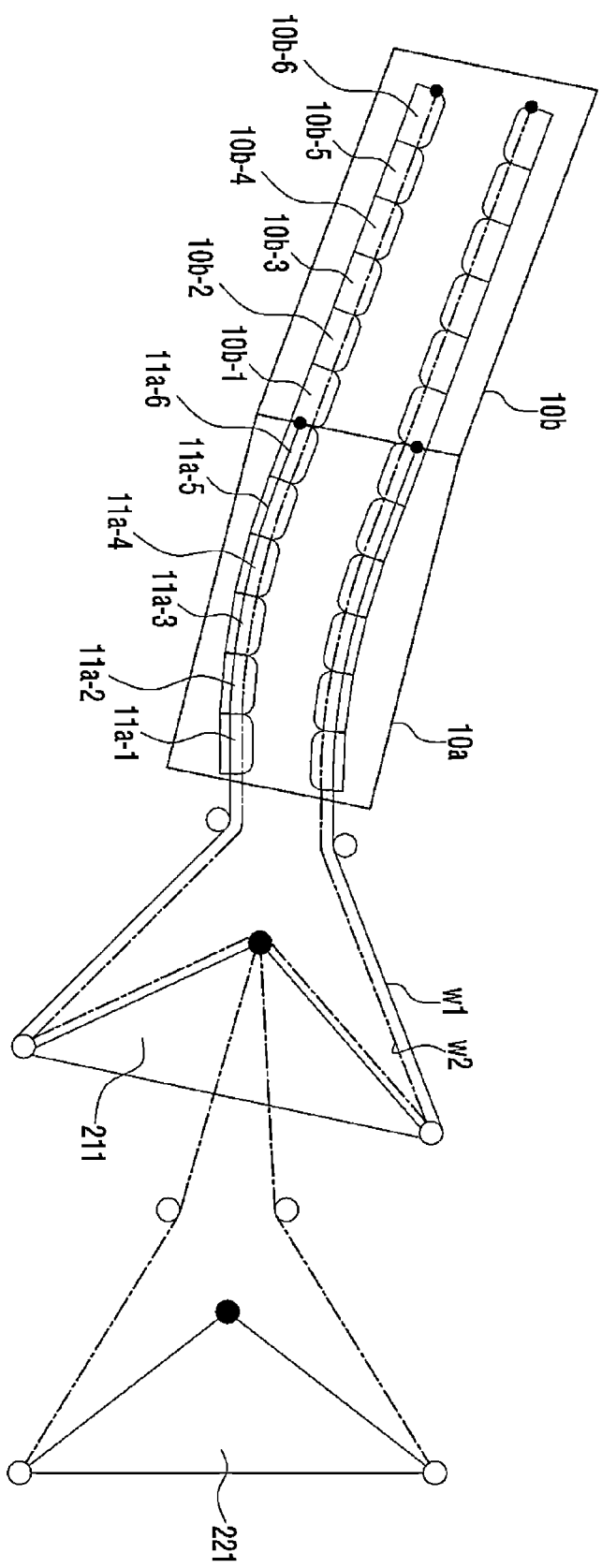

FIGS. 8 and 9 are concept views schematically illustrating operation of the manipulator according to some example embodiments and operation of the wire driving actuator in the manipulator.

Referring to FIGS. 8 and 9, FIG. 8 illustrates a state before rotation of the base section driving lever 211, while FIG. 9 illustrates a state in which the base section driving lever 211 rotates a desired angle.

For the sake of illustration, in FIGS. 8 and 9, the base section driving wires W1 and the terminal section driving wires W2 are illustrated as a solid line and as a broken line, respectively.

The base section driving wire W1 may sequentially pass through the base section 10*a* and base section driving lever 211, whereas the terminal section driving wire W2 may sequentially pass through the terminal section 10*b*, base section 10*a*, base section driving lever 211, and terminal section driving lever 221.

The base section driving wires W1 are installed at the base section driving lever 211 such that the base section driving wires W1 are substantially parallel with the terminal section driving wires W2. Accordingly, when the base section driving wires W1 are moved in accordance with operation of the base section driving lever 211, the terminal section driving wires W2 may be moved by a distance substantially equal to that of the base section driving wires W1.

As illustrated in FIGS. 8 and 9, when the base section driving lever 211 rotates in one direction, the two base section driving wires W1 are moved in accordance with the rotation of the base section driving lever 211, thereby bending the base section 10*a*. In this case, the terminal section driving wires W2 are moved by a distance substantially equal to that of the base section driving wires W1 and, as such, only the portion of each terminal section driving wire W2 arranged at the base section 10*a* and base section driving lever 211 is moved. Although the base section 10*a* is bent, the portion of each terminal section driving wire W2 arranged at the terminal section 10*b* and terminal section driving lever 221 is not moved. Accordingly, the terminal section 10*b* is maintained in a non-bending state, even when the base section 10*a* moves.

Figure 10:
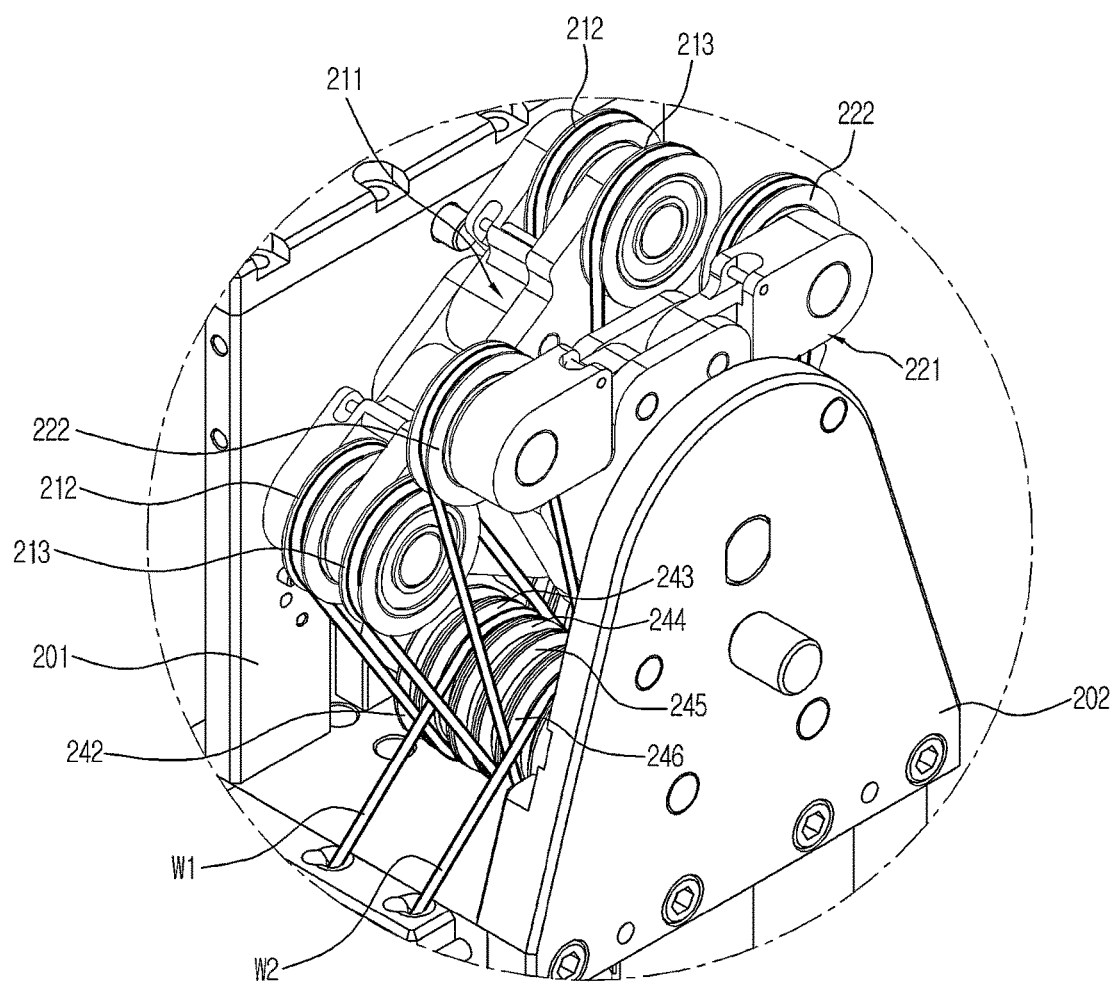
FIG. 10 is an enlarged view illustrating operation states of the driving levers and wires when the base section is bent in manipulator according to some example embodiments.
Figure 11:
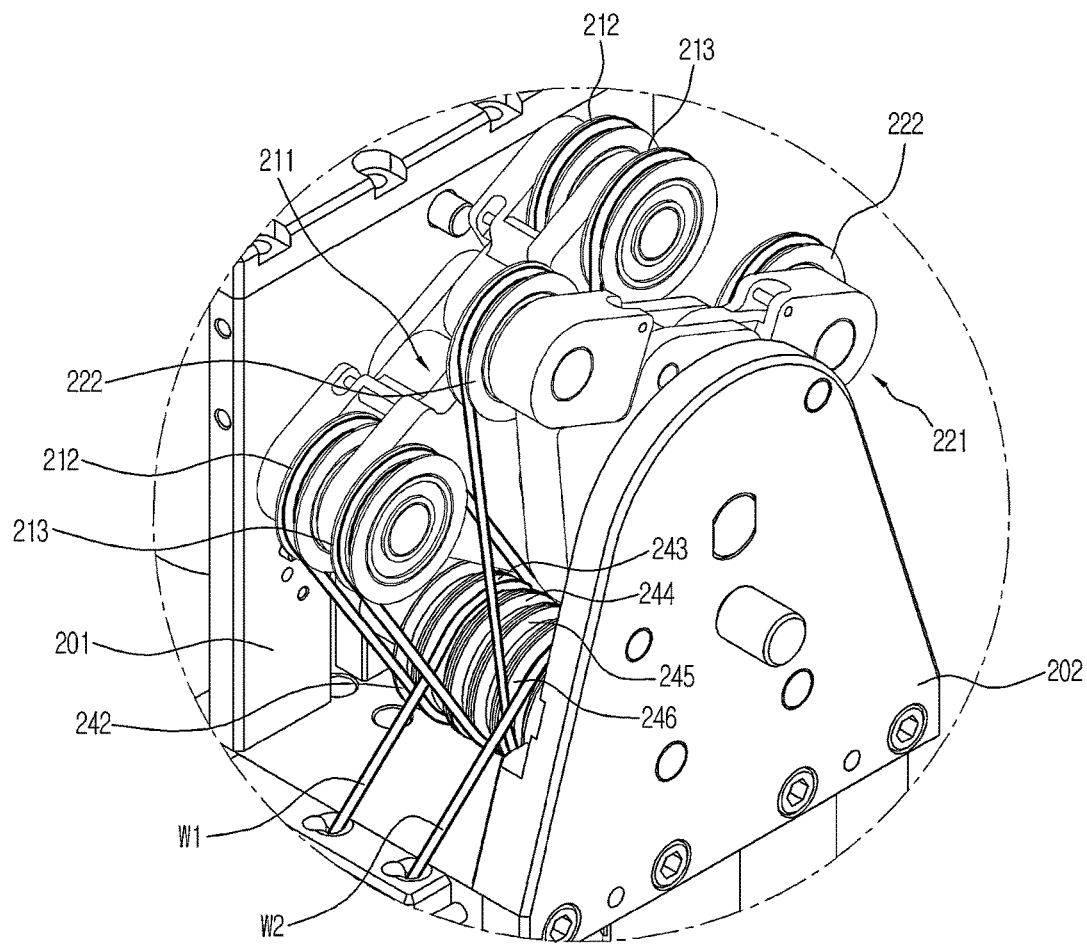
FIG. 11 is an enlarged view illustrating operation states of the driving levers and wires when both the base section and the terminal section are bent in manipulator according to some example embodiments.

FIG. 10 is an enlarged view illustrating operation states of the driving levers and wires when the base section is bent in manipulator according to some example embodiments. FIG. 11 is an enlarged view illustrating operation states of the driving levers and wires when both the base section and the terminal section are bent in manipulator according to some example embodiments.

Referring to FIGS. 10 and 11, FIG. 10 illustrates operation of the base section driving lever 211 upon bending the base section 10*a*, as illustrated in FIG. 2. FIG. 11 illustrates operation of the terminal section driving lever 221 upon bending both the base section 10*a* and the terminal section 10*b*, as illustrated in FIG. 3.

The positional relation among the associated first guide pulley 242, base section driving pulley 212 and second guide pulley 243 is identical to the position relation among the associated second guide pulley 243, linkage pulley 213, and third guide pulley 244, as described above, and, as such, the two terminal section driving wires W2 and two base section driving wires W1 on the base section driving lever 211 are maintained in a parallel state and, as such, the movement distance of the two terminal section driving wires W2 is equal to the movement distance of the two base section driving wires W1.

Since the two terminal section driving wires W2 are moved by a distance equal to that of the two base section driving wires W1 during movement of the two base section driving wires W1, the terminal section 10*b* is not bent, even when the base section 10*a* is bent. Accordingly, it is possible to prevent the terminal section 10*b* from being unintentionally bent.

In addition, the positional relation among the associated first guide pulley 242, base section driving pulley 212 and second guide pulley 243 is identical to the position relation among the associated third guide pulley 244, terminal section driving pulley 222, and fifth guide pulley 246, as described above, and, as such, the terminal section 10*b* is bent through the same angle as the bending angle of the base section 10*a* when the terminal section driving lever 221 is rotated through the same angle as the rotational angle of the base section driving lever 221. Accordingly, the base section driving lever 211 and terminal section driving lever 221 may be controlled in the same manner and, as such, it may be possible to conveniently control bending angles of the base section 10*a* and terminal section 10*b*.

The above-described example embodiments may be applied to various apparatuses employing a wire driving actuator, which operates a manipulator constituted by a joint assembly, using wires.

A joint assembly of a manipulator may have a plurality of wires that pass through a same section of the joint assembly. Conventionally, bending of one section of the joint assembly through movement of one wire may cause unintentional bending of the remaining sections of the joint assembly. In contrast, as described above, in some example embodiments, all wires are moved by the same distance when one wire moves and, as such, it is possible to prevent interference among the sections of the joint assembly.

Example embodiments may be widely applied to various fields associated with a surgical manipulator to be used in minimally invasive surgical procedures, a working manipulator to be used in works such as a welding work in a narrow space such as an interior of a tube, a feeding manipulator operating as a robot arm, etc.

Additionally, one of ordinary skill in the art will appreciate that the example embodiments may be applied to provide a joint assembly having improved bending operations to various other robot systems. For example, robotic systems for use in various manufacturing industries. Moreover, the terminal end of the joints may be connected to various tools, for example, surgical tools and non-surgical tools (e.g. hand tools, such as, a hammer, anvil, chisel, etc. and electronic tools, such as, a welder, torch, etc.).

Although a few example embodiments have been shown and described, it would be appreciated by those skilled in the art that changes may be made in these embodiments without departing from the principles and spirit thereof, the scope of which is defined in the claims and their equivalents.

What is claimed is:

1. A manipulator comprising:
a joint assembly including a plurality of joints included in a base section and terminal section of the joint assembly, the plurality of joints being interconnected; and
a wire driving actuator adjacent to the base section, the wire driving actuator configured to bend the base section of the joint assembly in plural directions via a plurality of base section driving wires and to bend the terminal section via a plurality of terminal section driving wires, the wire driving actuator including at least one base section driving lever and at least one terminal section driving lever, the at least one base section driving lever configured to drive the base section driving wires and the at least one terminal section driving lever configured to drive the terminal section driving wires, the terminal section driving wires passing through the base section driving lever such that the terminal section driving wires are operatively connected to the base section driving wires and, when the base section bends, the terminal section driving wires are moved by a distance equal to a movement distance of the base section driving wires.

2. The manipulator according to claim 1, wherein the wire driving actuator further includes a base frame, wherein
the at least one base section driving lever is rotatably mounted to the base frame, and
the at least one terminal section driving lever is rotatably mounted to the base frame while being coaxial with the base section driving lever,
and
the terminal section driving wires are on the base section driving lever such that the terminal section driving wires are substantially parallel with the base section driving wires.

3. The manipulator according to claim 2, wherein:
the base section driving lever includes,
base section driving pulleys, on which the base section driving wires are wound, and
linkage pulleys, on which the terminal section driving wires are wound, each of the linkage pulley being coaxial with a respective one of the base section driving pulleys; and
the terminal section driving lever includes terminal section driving pulleys, on which the terminal section driving wires extending from the linkage pulleys are wound.

4. The manipulator according to claim 3, further comprising:
guide shafts separated from the driving levers; and
guide pulleys on the guide shafts, the guide pulleys including,
first guide pulleys configured to guide the base section driving wires to the base section driving pulleys,
second guide pulleys configured to guide the base section driving wires extending from the base section driving pulleys,
third guide pulleys configured to guide the terminal section driving wires to the linkage pulleys,
fourth guide pulleys configured to guide the terminal section driving wires extending from the linkage pulleys to the terminal section driving pulleys, and
fifth guide pulleys configured to guide the terminal section driving wires extending from the terminal section driving pulleys.

5. The manipulator according to claim 4, wherein associated ones of the first guide pulleys, the base section driving pulleys and the second guide pulleys have a same positional relation as a position relation of associated ones of the second guide pulleys, the linkage pulleys, and the third guide pulleys, respectively.

6. The manipulator according to claim 5, wherein associated ones of the first guide pulleys, the base section driving pulleys and the second guide pulleys have a same positional relation as a position relation of associated ones of the third guide pulleys, the terminal section driving pulleys, and the fifth guide pulleys, respectively.

7. The manipulator according to claim 5, wherein:
the base section driving pulleys include a pair of base section driving pulleys symmetrically at opposite sides of the base section driving lever,
the linkage pulleys include a pair of linkage pulleys symmetrically at opposite sides of the base section driving lever,
the terminal section driving pulleys include a pair of terminal section driving pulleys symmetrically at opposite sides of the terminal section driving lever,
the guide shafts include, a pair of guide shafts symmetrically mounted to the base frame, and the first to fifth guide pulleys on the guide shafts include pairs of first through fifth guide pulleys symmetrically on the base frame,
the base section driving wires include a pair of base section driving wires symmetrically at opposite sides of the base section driving lever, and
the terminal section driving wires include a pair of terminal section driving wires symmetrically at opposite sides of the terminal section driving lever.

8. The manipulator according to claim 7, wherein:
the at least one base section driving lever includes a pair of base section driving levers symmetrically at opposite sides of the base frame,
the at least one terminal section driving lever includes a pair of terminal section driving levers symmetrically at opposite sides of the base frame, and
each of the first to fifth guide pulleys are mounted on both guide shafts of the pairs of guide shafts.

9. The manipulator according to claim 2, wherein the wire driving actuator further comprises:
a plurality of driving motors configured to generate rotational force,
a plurality of pinions configured to rotate based on the rotational force generated by the driving motors, and
a plurality of gears on one of the base section driving lever and the terminal section driving lever, each of the gears configured to engage a respective one of the pinions.

10. The manipulator according to claim 2, wherein the wire driving actuator further comprises:
position identification members, each of the position identification members on one of at the base section driving lever and the terminal section driving lever; and
sensors configured to sense the position identification members.

11. An actuator configured to actuate a joint assembly having interconnected joints arranged along a base and terminal section thereof, the actuator comprising:
a terminal driving lever including a plurality of terminal pulleys and associated terminal cables, the terminal driving lever configured to bend the joints in the terminal section of the joint assembly; and
a base driving lever including a plurality of base pulleys and associated base cables, the base driving lever configured to bend the joints in the base section of the joint assembly such that, when the base driving lever bends the joints in the base section, the base driving lever exerts an adjustment force on the terminal cables such that the terminal cables are pulled a same distance as associated base cables.

12. The actuator of claim 11, wherein the base driving lever and the terminal driving lever are configured to rotate around a central shaft.

13. The actuator of claim 12, wherein the plurality of base pulleys associated with the base driving lever are configured to rotate around the central shaft along with the base driving lever and include a drive pulley and a link pulley, the drive pulley configured to pull the base cable and the link pulley configured to pull the terminal cables.

14. The actuator of claim 13, wherein the drive pulley and the link pulley are on the base driving lever such that the drive pulley and the link pulley are symmetrical with respect to the central shaft.

15. The actuator of claim 14, further comprising:
first guide pulleys on a first guide shaft and second guide pulleys on a second guide shaft, each of the first guide pulleys and second guide pulleys including pulleys configured to pull the terminal cable and the driving cable.

16. The actuator of claim 15, wherein associated ones of the first guide pulleys and the drive pulley have a same positional relation as a position relation of associated ones of the second guide pulley and the linkage pulley.

17. The actuator of claim 15, wherein
the first guide pulleys and the second guide pulleys are symmetrically on the first guide shaft and the second guide shaft, respectively,
the first guide pulleys include first to fifth first guide pulleys on the first guide shaft, and
the second guide pulleys include first through fifth second guide pulleys on the second guide shaft.

18. The actuator of claim 11, further comprising:
pinions configured to selectively engage gears of one or more of the base driving lever and the terminal driving lever; and
a plurality of driving motors configured to exert rotational forces on the pinions such that the one or more of the base driving lever and the terminal driving lever rotate about the central shaft.

19. The actuator of claim 18, wherein the base driving lever and the terminal driving lever have positional markers associated therewith, the positional markers indicating a rotational position of an associated one of the base driving lever and the terminal driving lever about the central axis.

20. The actuator of claim 19, further comprising:
sensors configured to sense the rotational position of the base driving lever and the terminal driving lever about the central axis.

* * * * *